(12) United States Patent
Xu

(10) Patent No.: US 7,744,241 B2
(45) Date of Patent: Jun. 29, 2010

(54) HIGH BRIGHTNESS LIGHT SOURCE USING LIGHT EMITTING DEVICES OF DIFFERENT WAVELENGTHS AND WAVELENGTH CONVERSION

(75) Inventor: Li Xu, Saratoga, CA (US)

(73) Assignee: YLX, Ltd. (KY)

( * ) Notice: Subject to any disclaimer, the term of this patent is extended or adjusted under 35 U.S.C. 154(b) by 592 days.

(21) Appl. No.: 11/762,581

(22) Filed: Jun. 13, 2007

(65) Prior Publication Data
US 2008/0310845 A1    Dec. 18, 2008

(51) Int. Cl.
*F21V 9/16* (2006.01)
*F21V 9/00* (2006.01)

(52) U.S. Cl. .................. 362/231; 362/84; 362/235; 362/583

(58) Field of Classification Search .......... 362/231, 362/84, 235, 293, 583, 551, 230, 800; 345/82, 345/83; 398/82, 85, 149; 313/498, 501
See application file for complete search history.

(56) References Cited

U.S. PATENT DOCUMENTS 7,070,300 B2    7/2006  Harbers et al.
7,415,210 B2 *  8/2008  Gurevich et al. ............ 398/86
2007/0047608 A1 *  3/2007  Volodin et al. ........... 372/50.12

FOREIGN PATENT DOCUMENTS

WO    2006/102846 A1    10/2006

* cited by examiner

*Primary Examiner*—Bao Q Truong
*(74) Attorney, Agent, or Firm*—Chen Yoshimura LLP

(57) ABSTRACT

A wavelength division multiplexer and etendue conserved optics are used to combine multiple wavelength LED lights into a combined light. The combined light, with higher intensity and higher power than the light from an individual LED, is used to excite a wavelength conversion material such as phosphors to generate a high brightness and high power light. Light generated by multiple LEDs of the same wavelength may be coupled into a optical fiber bundle before inputting it into the wavelength-division multiplexer, further increasing the brightness and power. The wavelength conversion material may generate light of three different color under excitation by different LED lights, or a white light with higher brightness and higher power. Such a light source can be used in image display devices such as a projector or in illumination systems.

20 Claims, 3 Drawing Sheets

HIGH BRIGHTNESS LIGHT SOURCE USING LIGHT EMITTING DEVICES OF DIFFERENT WAVELENGTHS AND WAVELENGTH CONVERSION

BACKGROUND OF THE INVENTION

1. Field of the Invention

This invention relates to lighting devices and systems, and in particular, it relates to high brightness light sources.

2. Description of the Related Art

Light sources are used in a wide variety of application, including image projection such as rear projection TV (RPTV) or front projector, headlights or illumination lights for transportation vehicles such as automobiles, motorcycles, boats and airplanes, etc. One import requirement for a light source is to provide high brightness and high power output at the same time. Currently, light sources for these and other applications are still dominated by traditional light sources such as high-pressure mercury lamps, Xenon lamps or metal halide lamps. However, the arc lamps have technical limitations in many applications: relatively short lifetime, difficulty to control and maintain its color, un-stability especially when operating in a pulsed mode. For many applications, especially in an environment where heat generation is undesirable or when electricity is unavailable, light from the light source needs to be coupled into optical fibers or waveguide and directed to where illumination is required. However, the coupling from the arc lamp into fiber can be costly, bulky, inefficient and unstable due to, e.g., the change of discharge arc itself from time to time. In many cases, the arc lamp also potentially interferes with other components in a system.

Solid state light sources, especially light emitting diodes (LEDs), exhibit longer lifetimes, lower power consumption, manageable wavelengths and other benefits in comparison with the above and other traditional light sources. Therefore, these solid-state light sources increasingly become the alternative or even preferred choice of light sources for a variety of applications. However, there are many performance issues that need to be improved for LEDs so that their applications can be broadened. Currently, two potential solutions can be explored to achieve high brightness and high power LED light sources. The first one is to further improve individual LED chip performance by increase chip dimension and improve its quality. However, this approach is limited by the total output of one individual chip, currently in tens of lumen level in the visible wavelength range. Going to larger area chips and higher driving currents can increase the total output but will compromise the device lifetime and brightness. The chip uniformity and thermal dissipation of large LED chip are serious limitation for this approach. The second approach is to package many LED chips together in an array structure to obtain high total output, up to hundreds even thousands lumens currently. The brightness of light directly from an LED array is significantly lower than that of single LED since the array brightness is limited by the relatively low package density of LEDs in the array. The major challenge of high-density LED packaging is the thermal management of the high power operation of LEDs since the LED interferes each other thermally if they are too close to each other. Due to the reasons discussed above, when the application demanding high brightness and high power at the same time, the traditional light source such as high pressure mercury lamp or metal halide lamp are still the choice of applications.

SUMMARY OF THE INVENTION

The present invention is directed to a light source that substantially obviates one or more of the problems due to limitations and disadvantages of the related art.

An object of the present invention is to provide a high brightness and high power light source.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a light source, which includes: two or more light emitting devices for generating light having respective spectra different from each other; a wavelength-division multiplexer receiving the light from the two or more light emitting devices and combining them into a combined light which exits an output end of the wavelength-division multiplexer; and a wavelength conversion material disposed near the output end of the wavelength-division multiplexer, the wavelength conversion material absorbing the combined light and emitting an output light having a spectrum different from the spectra of the light generated by the emitting devices.

The light source preferably also includes two or more light-coupling devices each for coupling the light generated by a light emitting devices to the wavelength-division multiplexer, a dichroic filter disposed between the output end of the wavelength-division multiplexer and the wavelength conversion material for transmitting the combined light from the wavelength-division multiplexer and reflecting light generated by the wavelength conversion material, an output light-coupling device disposed between the output end of the wavelength-division multiplexer and the wavelength conversion material for coupling the combined light to the wavelength conversion material.

Practical applications of such a light source include illumination systems and image display devices such as projectors.

It is to be understood that both the foregoing general description and the following detailed description are exemplary and explanatory and are intended to provide further explanation of the invention as claimed.

DETAILED DESCRIPTION OF THE PREFERRED EMBODIMENTS

Wavelength conversion using a light source, such as a light emitting diode (LED), and a wavelength conversion material, such as phosphors, can produce high brightness light having a wavelength different from the wavelength of the LED light. Embodiments of the present invention utilize a wavelength-division multiplexer to combine light of different wavelengths from a plurality of light sources such as LEDs to impinge on and excite a wavelength conversion material to achieve a high brightness and high power light source. The light from the LED may be in the UV and blue area. The wavelength conversion material may be phosphor materials or nano-material such as quantum dots. The absorption spectrum of the wavelength conversion material preferably covers the wavelengths of the multiple LEDs, and the emission spectrum of the wavelength conversion material may be broad (e.g. a white light) or narrow (e.g., single color, such as red, green and blue). If the output spectra of the wavelength conversion material under multiple LED excitations are well overlapped, the output from the wavelength conversion material can achieve a high brightness and high power light. By using a wavelength-division multiplexer and etendue conserved optics to combine LED outputs with different wavelengths, the combined power outputted by the wavelength conversion material is increased without increasing the etendue.

Wavelength-division multiplexers (WDMs) are widely used in fiber-optic communications to multiplex multiple optical carrier signals of different wavelengths on a single optical fiber to achieve a multiplication in signal carrying capacity. A wavelength-division multiplexer is typically constructed using one or more filters (hereinafter referred to as WDM filters) that transmit light in certain wavelength ranges and reflect light in certain other wavelength ranges.

Figure 1:
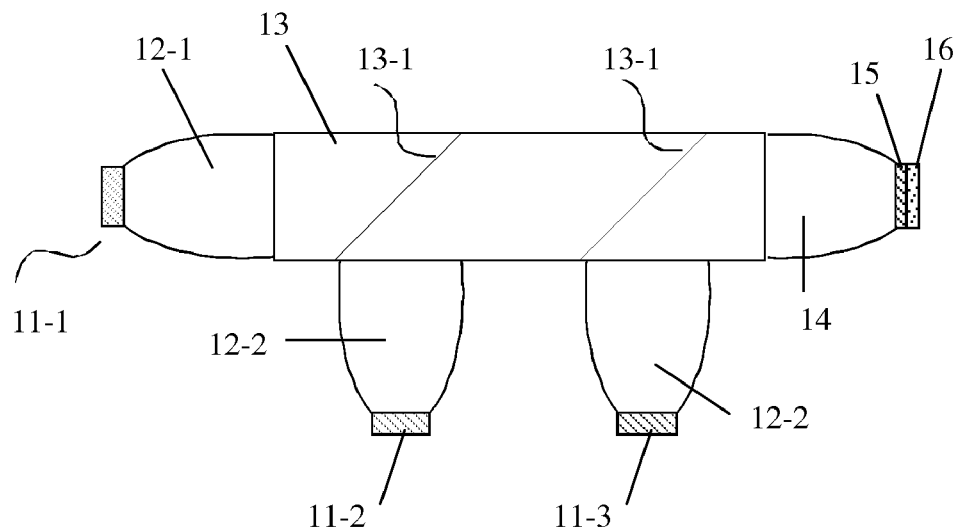
FIG. 1 illustrates a light source device and system according to an embodiment of the present invention.

FIG. 1 illustrates a light source device and system according to embodiments of the present invention. This system combines output light from a plurality of light emitting devices with different wavelengths to achieve a high brightness and high power light source. In the illustrated embodiment, a wavelength-division multiplexer 13 having two WDM filters 13-1 and 13-2 is used to combine the output light from three light emitting devices 11-1, 11-2 and 11-3. The light emitting devices may be light emitting diodes (LEDs), laser diodes, other solid-state light sources, or other suitable light sources. Light-coupling devices 12-1, 12-2 and 12-3 are used to couple the light from the light emitting devices to the wavelength-division multiplexer 13. Each of the light-coupling devices 12-1, 12-2 and 12-3 may have a structure similar to that shown in FIG. 3, described in more detail later. Although not shown in FIG. 1, an optical fiber may be used to couple the light from each light emitting device to the wavelength-division multiplexer. If an optical fiber is used, suitable light-coupling optics such as that shown in FIG. 3 may be used to couple the light from the light emitting devices to the optical fiber. An optical fiber together with the light-coupling optics may be generally referred to as a light-coupling device for coupling the light from the light emitting device to the wavelength-division multiplexer.

The wavelength-division multiplexer 13 includes first and second WDM filters 13-1 and 13-2 arranged successively along an optical path. The light from the first light emitting device 11-1, having a first wavelength, is transmitted through the first and second WDM filters to reach an output light-coupling device 14 at the output end of the wavelength-division multiplexer 13. The light from the second light emitting device 11-2, having a second wavelength different from the first wavelength, enters the wavelength-division multiplexer 13 at an angle different from the angle at which the light from the first light emitting device 11-1 enters, and is reflected by the first WDM filter 13-1 and transmitted by the second WDM filter 13-2 to reach an output light coupling device 14. The light from the third light emitting device 11-3, having a third wavelength different from the first and second wavelengths, enters the wavelength-division multiplexer 13 at an angle different from the angle at which the light from the first light emitting device 11-1 enters, and is reflected by the second WDM filter 13-2 to reach an output light coupling device 14. The first WDM filter 13-1 is one that will transmit light with the first wavelength and reflect light with the second wavelength, and the second WDM filter 13-2 is one that will transmit light with the first and second wavelengths and reflect light with the third wavelength. Although three light emitting devices are shown in FIG. 1, other numbers of light emitting devices may be used and the number of WDM filters will change accordingly. The structure and construction of a free space wavelength-division multiplexer for combining light from different sources are well known in the art, and many different structures may be used to form a wavelength-division multiplexer. Wavelength-division multiplexers in single fibers have also been made, but they tend to be more expensive with current technologies and are therefore currently less preferred.

The output light-coupling device 14 is located at the output end of the wavelength-division multiplexer 13 and receives light from all three light emitting devices. The output light-coupling device 14 shown in FIG. 1 is a low loss compound parabolic concentrator (CPC) designed to reduce the output aperture size and increase light intensity, but a light-coupling device that does not reduce the output aperture size may also be used.

A wavelength conversion material 16, which may be phosphor materials or nano-materials such as quantum dots, is provided at the output end of the light-coupling device 14. The wavelength conversion material absorbs the light from the multiple light emitting devices after they are combined by the wavelength-division multiplexer 13, and emits a light having different spectrum than the absorbed light. The light from the light emitting devices (referred to as the excitation light) is typically blue or UV light, and the light emitted by the wavelength conversion material typically has longer wavelengths than the excitation light. The absorption spectrum of the wavelength conversion material 16 preferably covers the spectra of all of the multiple light emitting devices so the lights from all light emitting devices are absorbed and converted. In one example, the lights from the three light emitting devices 11-1, 11-2 and 11-3 have wavelengths of 360 nm, 405 nm and 420 nm, respectively. Thus, in such an example, the absorption spectrum of the wavelength conversion material 16 should cover all of these wavelengths.

Various types of wavelength conversion materials have different absorption and emission characteristics. The absorption spectrum of a wavelength conversion material typically depends on the material properties. For example, certain phosphors manufactured by Intematix, such as G3161, Y4254, O5742, etc., have relatively broad absorption spectra. Some other wavelength conversion materials, such as FL63/S-D1, HPL63/F-F1, QMK58/F-U1, QUMK58/F-D1, etc. manufactured by Phosphors Technology Ltd., have relatively narrow absorption spectra. The emission spectrum of a wavelength conversion material such as phosphors is the intrinsic property of the material and is typically relatively independent of the wavelength of the excitation light. The emission spectrum of a wavelength conversion material may be broad (for example, a white light) or narrow (for example, being a single color such as red, blue or green). For example, the above mentioned phosphors made by Intematix have relatively broad emission spectra. The wavelength conversion material 16 may be a single active material that has an absorption spectrum covering the wavelengths of multiple excitation lights, or a composite material with different active material components that absorb different wavelength lights and emit lights having similar or different emission spectra. The choices of wavelength conversion material 16 for the light source system should be made by considering the wavelengths of the excitation lights, the type of application (i.e. what type of output light is desired), and other appropriate factors such as cost.

In one type of application, the wavelength conversion material 16 has a broad absorption spectrum. When such a material is excited by three lights having different wavelength but all falling within the absorption spectrum, the light emitted by the wavelength conversion material 16 will be approximately three times brighter than when the wavelength conversion material is excited by one of the three lights.

In another application, the wavelength conversion material is a composite material including three components, each of which absorbs one excitation light and emits one output light having a relatively narrow spectrum. If the emission spectra of the wavelength conversion material 16 corresponding to the three excitation lights are sufficiently separated, the light source system of FIG. 1 may be used to generate three colored lights, such as red, green and blue lights, from the same composite wavelength conversion material. In such an application, the three light emitting devices 11-1, 11-2 and 11-3 may be driven to turn on/off or turn on at different intensities to change the color of the light emitted by the wavelength conversion material. One practical application of such a light source system is to construct image display devices such as projectors.

Figure 4A:
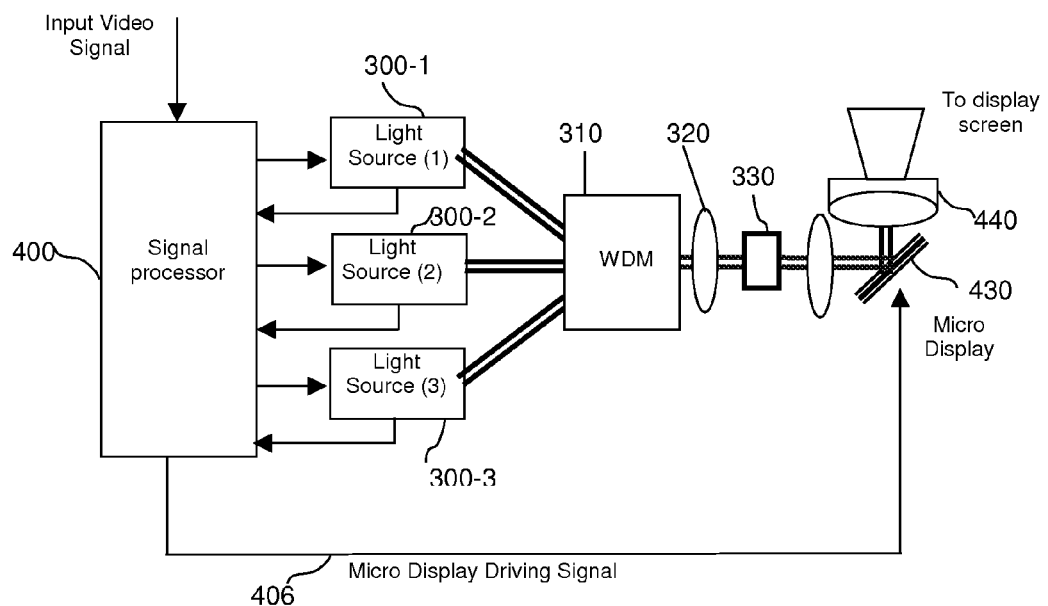
FIG. 4A illustrates a projection display system according to an embodiment of the present invention.

FIG. 4A shows a projection display system using such a light source. The excitation lights from three light emitting devices 300-1, 300-2 and 300-3 are combined by the wavelength-division multiplexer 310 and focused by a light coupling device (focusing optics) 320 to impinge on a wavelength conversion material 330. The light emitted by the wavelength conversion material 330 is directed to a microdisplay device 430, and projected to a screen by appropriate optics. The three light emitting devices 300-1, 300-2 and 300-3 are driven by a signal processor 400, which also drives the micro-display device 430 in a synchronized fashion. The signal processor 400 may receive a video signal as input.

Figure 4B:
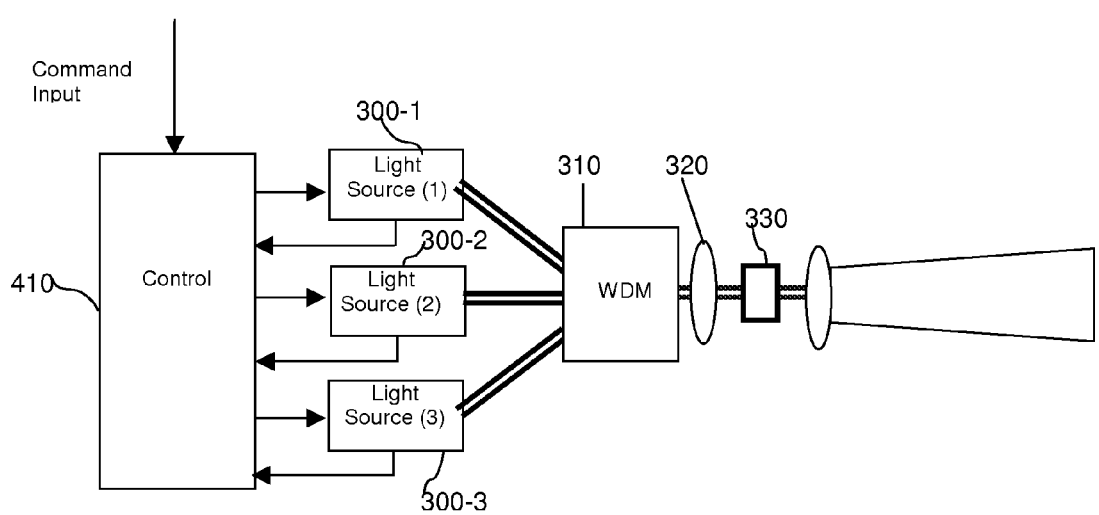
FIG. 4B illustrates an illumination system that generates light of various colors or color temperatures according to an embodiment of the present invention.

In another practical application, the three light emitting devices may be selectively turned on/off or turned on at different intensities to generate white lights of different color temperatures, e.g., "cool white" or "warm white" lights. Such light sources may be useful in various illumination systems, including but not limited to headlights or illumination lights for transportation vehicles such as automobiles, motorcycles, boats and airplanes. FIG. 4B illustrates such an illumination system, where excitation lights from three light emitting devices 300-1, 300-2 and 300-3 are combined by the wavelength-division multiplexer 310 and focused by a light coupling device (focusing optics) 320 to impinge on a wavelength conversion material 330. A control circuit 410 receives an external command as input and controls the three light emitting devices 300-1, 300-2 and 300-3 accordingly.

In the instant disclosure, the wavelength-division multiplexer is said to "combine" the different input lights into a combined light, even through in systems such as those shown in FIGS. 4A and 4B, sometimes not all of the multiple input lights are present. Thus, the word "combine" should be understood to include the meaning of having the ability to direct multiple input lights to a common output, regardless of whether the input lights are present at the same time. Similarly, a "combined light" may have some but not all of the input lights, depending on how the light emitting devices are driven.

Figure 2:
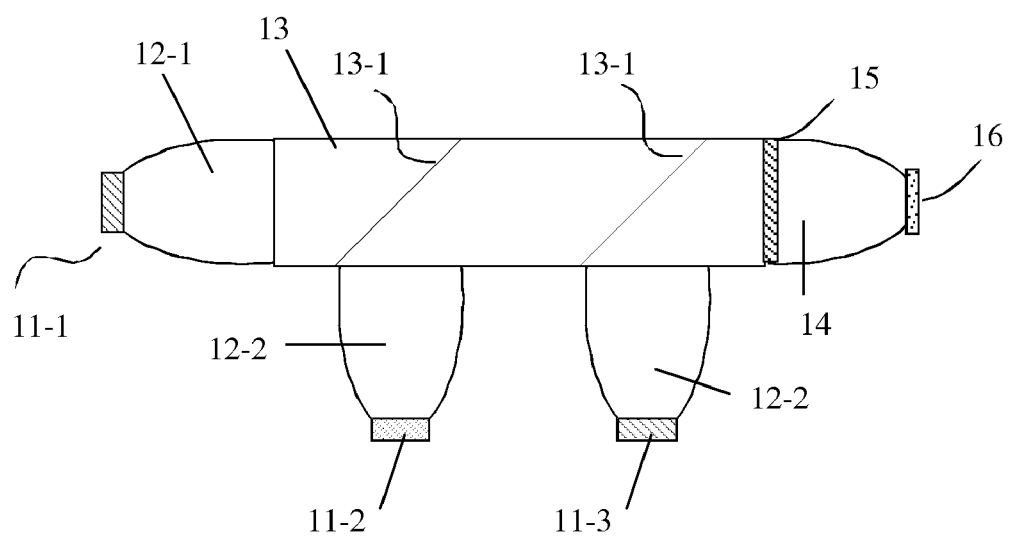
FIG. 2 illustrates a light source device and system according to another embodiment of the present invention.

In the embodiment shown in FIG. 1, a dichroic filter 15 is provided before the wavelength conversion material 16 to pass the excitation light from the output light-coupling device 14 and reflect the light emitted by the wavelength conversion material (typically of longer wavelength than the excitation light). The filter 15 can prevent the light generated by the wavelength conversion material from propagating back to the wavelength-division multiplexer 13 and increase light generating efficiency. In an alternative embodiment shown in FIG. 2, the dichroic filter 15 is located between the output end of the wavelength-division multiplexer 13 and the light-coupling device 14. The embodiment of FIG. 2 is otherwise similar to that of FIG. 1. As another alternative (not shown in the figures), the output light-coupling device 14 is omitted, and the dichroic filter 15 and the wavelength conversion material 16 are directly provided at the output end of the wavelength-division multiplexer 13.

Although it is preferable that the light from each light emitting device 11-1 to 11-3 is monochromatic or near monochromatic, each light emitting device may also emit a broad-spectrum light.

Figure 3:
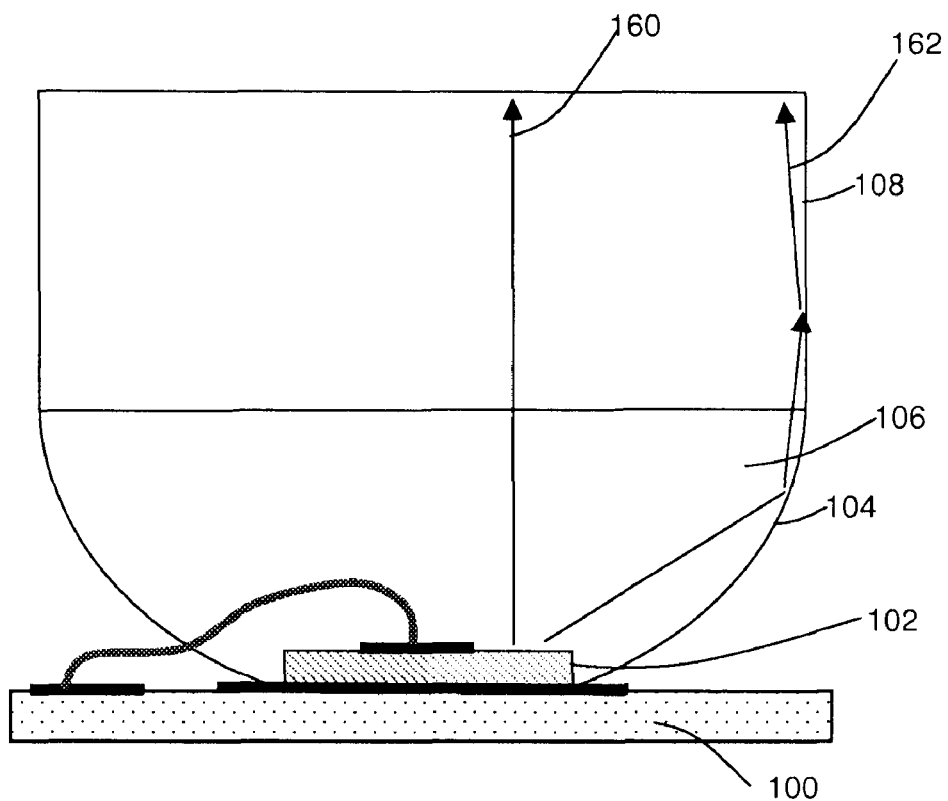
FIG. 3 illustrates a structure for coupling the light from a light emitting diode into an optical fiber.

FIG. 3 shows a structure for coupling the light from a light emitting device such as a light emitting diode (LED) into an optical fiber. Such a high efficiency light coupling device for coupling solid-state light source into etendue maintained optical waveguide/fiber is described in commonly-owned international patent application publication WO 2006/102846, published Oct. 5, 2006. As shown in FIG. 3 (similar to FIG. 1 of the above-referenced publication), a light emitting device 102 such as an LED is mounted on a base place 100, and light rays 160 and 162 emitted from the LED 102 are coupled to an optic fiber 108 by an index-matched media 106 either directly or after being reflected on the surface of the index-matched media (either by a reflective coating or by total internal reflection). The optical fiber 108 can be designed to have a desired etendue by selecting the numerical aperture (NA) and the core size of optical fiber 108 (etendue is the product of the numerical aperture and the aperture dimension or spot size of the fiber 108 or the light emitting device 102).

Although not shown in FIGS. 1 and 2, each light emitting device 11-1, 11-2 or 11-3 may be composed of a plurality of physical devices that emit light at the same wavelength, and each light-coupling device 12-1, 12-2 or 12-3 may include an optical fiber bundle for coupling the light from the plurality of physical devices into the wavelength-division multiplexer. The output ends of the optical fibers in the bundle may be fused together. The above-referenced patent publication WO 2006/102846 describes various structures for coupling light from multiple LEDs into a fiber bundle. Using multiple physical devices for each light emitting device 11-1, 11-2 or 11-3 increases the output power within each wavelength range and the total output power.

It will be apparent to those skilled in the art that various modification and variations can be made in the light source device and system of the present invention without departing from the spirit or scope of the invention. Thus, it is intended that the present invention cover modifications and variations that come within the scope of the appended claims and their equivalents.

What is claimed is:

1. A light source comprising:
   two or more light emitting devices for generating lights having respective spectra different from each other;
   a wavelength-division multiplexer for receiving the light from the two or more light emitting devices and for combining them into a combined light which exits an output end of the wavelength-division multiplexer; and
   a wavelength conversion material disposed near the output end of the wavelength-division multiplexer, the wavelength conversion material absorbing the combined light and emitting an output light having a spectrum different from the spectra of the lights generated by the light emitting devices.

2. The light source of claim 1, wherein each light emitting device is a solid state light source.

3. The light source of claim 1, wherein each light emitting device is a light emitting diode.

4. The light source of claim 1, further comprising:
   two or more light-coupling devices each for coupling the light generated by one of the light emitting devices to the wavelength-division multiplexer.

5. The light source of claim 4, wherein each light-coupling device includes an optical fiber.

6. The light source of claim 1, wherein the wavelength-division multiplexer comprises one or more wavelength-division multiplexing filters, each wavelength-division multiplexing filter transmitting light in a first wavelength range and reflecting light in a second wavelength range different from the first wavelength range.

7. The light source of claim 1, further comprising:
   a dichroic filter disposed between the output end of the wavelength-division multiplexer and the wavelength conversion material for transmitting the combined light from the wavelength-division multiplexer and reflecting the output light generated by the wavelength conversion material.

8. The light source of claim 1, further comprising:
   an output light-coupling device disposed between the output end of the wavelength-division multiplexer and the wavelength conversion material for coupling the combined light to the wavelength conversion material.

9. The light source of claim 8, further comprising:
   a dichroic filter disposed between the output light-coupling device and the wavelength conversion material, the dichroic filter transmitting the combined light from the output light-coupling device and reflecting the output light generated by the wavelength conversion material.

10. The light source of claim 8, further comprising:
    a dichroic filter disposed between the output end of the wavelength-division multiplexer and the output light-coupling device, the dichroic filter transmitting the combined light from the wavelength-division multiplexer and reflecting the output light generated by the wavelength conversion material.

11. The light source of claim 1, wherein each light emitting device comprises a plurality of light emitting diodes, the light source further comprising two or more light-coupling devices each including an optical fiber bundle having a plurality of optical fibers, each optical fiber coupling the light generated by one of the light emitting diodes to the wavelength-division multiplexer.

12. The light source of claim 1, wherein the two or more light emitting devices comprise three light emitting diodes emitting lights having wavelengths of 360 nm, 405 nm and 420 nm, respectively.

13. The light source of claim 1, wherein the wavelength conversion material generates lights of different colors after absorbing lights generated by different ones of the two or more light emitting devices.

14. The light source of claim 1, wherein the two or more light emitting devices comprise first, second and third light emitting devices, and wherein the wavelength conversion material generates red, green and blue lights, respectively, after absorbing lights generated by the first, second and third light emitting devices, respectively.

15. A display system comprising:
    two or more light emitting devices for generating lights having respective spectra different from each other;
    a wavelength-division multiplexer for receiving the light from the two or more light emitting devices and for combining them into a combined light which exits an output end of the wavelength-division multiplexer;
    a wavelength conversion material disposed near the output end of the wavelength-division multiplexer to absorb the combined light and emit an output light, the wavelength conversion material emitting lights of different colors when absorbing lights from different ones of the two or more light emitting devices;
    a micro-display device for directing the light emitted by the wavelength conversion material to a screen; and
    a signal processor coupled to and controlling the two or more light emitting devices and the micro-display device.

16. The display system of claim 15, further comprising:
    an output light-coupling device disposed between the output end of the wavelength-division multiplexer and the wavelength conversion material for coupling and focusing the combined light to the wavelength conversion material.

17. The display system of claim 15, further comprising:
    a dichroic filter disposed between the output end of the wavelength-division multiplexer and the wavelength conversion material for transmitting the combined light from the wavelength-division multiplexer and reflecting the output light generated by the wavelength conversion material.

18. An illumination system comprising:
    two or more light emitting devices for generating lights having respective spectra different from each other;
    a wavelength-division multiplexer for receiving the light from the two or more light emitting devices and for combining them into a combined light which exits an output end of the wavelength-division multiplexer;
    a wavelength conversion material disposed near the output end of the wavelength-division multiplexer to absorb the combined light and emit an output light, the wavelength conversion material emitting lights of different colors when absorbing lights from different ones of the two or more light emitting devices; and
    a control circuit coupled to and controlling the two or more light emitting devices.

19. The illumination system of claim 18, further comprising:
    an output light-coupling device disposed between the output end of the wavelength-division multiplexer and the wavelength conversion material for coupling and focusing the combined light to the wavelength conversion material.

20. The illumination system of claim 18, further comprising:
a dichroic filter disposed between the output end of the wavelength-division multiplexer and the wavelength conversion material for transmitting the combined light from the wavelength-division multiplexer and reflecting the output light generated by the wavelength conversion material.

\* \* \* \* \*